Sept. 29, 1942. D. PARKER 2,297,110
DUSTING APPARATUS AND NOZZLE CONSTRUCTION
Filed Aug. 5, 1939
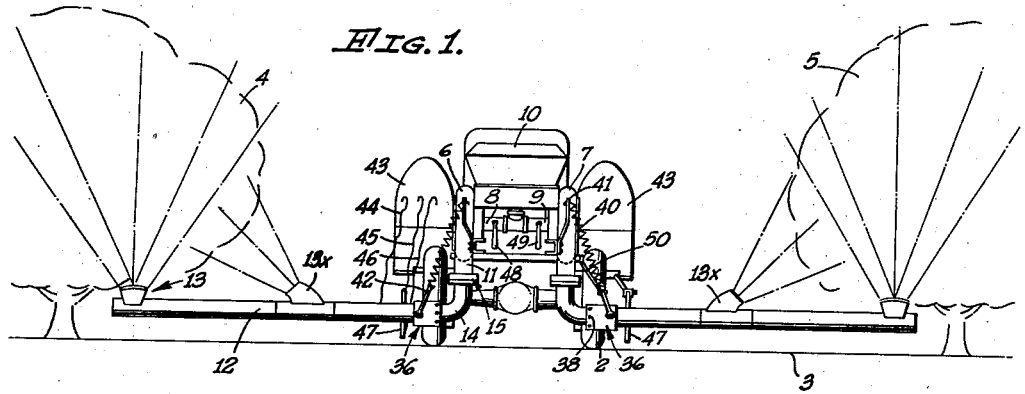
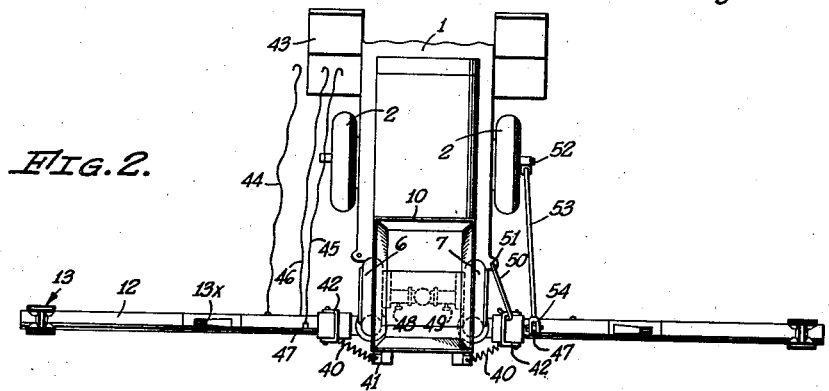
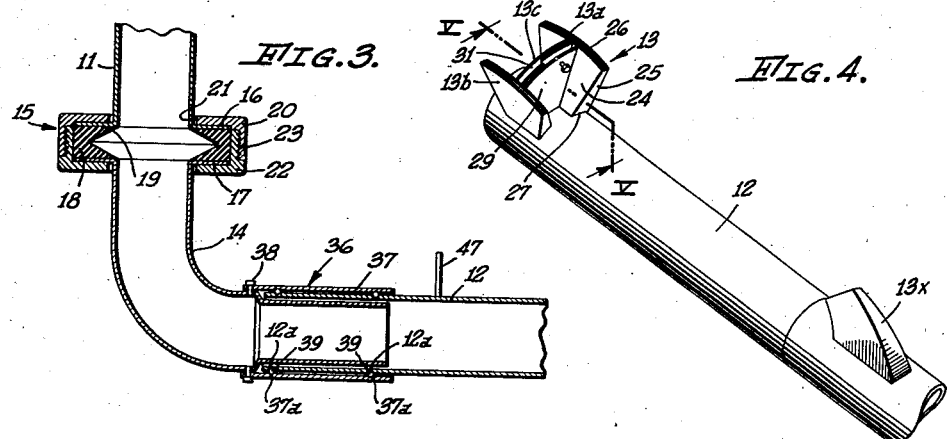
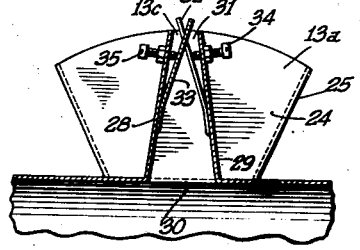
INVENTOR.
DONALD PARKER
BY
ATTORNEY.

Patented Sept. 29, 1942

2,297,110

UNITED STATES PATENT OFFICE 2,297,110

DUSTING APPARATUS AND NOZZLE CONSTRUCTION

Donald Parker, Fresno, Calif.

Application August 5, 1939, Serial No. 288,628

5 Claims. (Cl. 43—148)

My invention relates to dust applying machines and has particular reference to an apparatus adapted for dusting or "dry spraying" of fruit trees, vines, vegetable plants and the like with insecticide or fungicide in the form of dry dusts.

The practice of dry dusting trees, vines and plants with powdered insecticides and fungicides has become a well established method for controlling certain insect pests. For example, the dry dusting of citrus trees with sulphur dust for thrips has become a recognized treatment in this industry while likewise the dusting of insecticides on plants, vegetable crops and the like has been practiced by use of aeroplane dusters.

In the treatment of citrus trees and, to some extent, deciduous trees with dry dusts, an apparatus has been used comprising generally a carriage device which may be moved along the space between adjacent rows of trees and carries a dust bin from which the dust may be fed into a blast of air from one or more blowers mounted on the carriage, the air and dust blast being conducted by one or more conduits extending outwardly from the carriage and arranged to be disposed beneath the overhanging branches of the trees.

In my copending application Serial No. 284,882, filed July 17, 1939, now Patent No. 2,226,136 of December 24, 1940, I have disclosed a dust applicator which employs a pair of dusting nozzles, one on each of a pair of conduits which extend respectively on either side of the carriage so that a pair of rows of trees may be treated simultaneously, the conduits there illustrated being pivotally mounted on the carriage for a swinging movement in a horizontal direction to dispose the nozzles beneath a tree in advance of the position of the carriage and then as the carriage advances along the row the nozzle may remain beneath that tree until the carriage has passed. Then the nozzle may be swung forwardly to a position beneath the next adjacent tree. In that application I have illustrated and described a control for the nozzles which will allow the nozzles to be rotated about a horizontal axis to produce a more even distribution of the dust throughout the tree.

It is an object of the present invention to provide an improved nozzle and conduit construction and mounting for use with the carriage illustrated in my copending application hereinbefore referred to and which will provide for a more widely diffused spread of the dust.

It is another object of my invention to provide a nozzle and conduit structure and mounting therefor which will permit the same nozzle structure and the same dusting apparatus to be employed for the dusting of low growing vegetables and plants as well as trees.

During the summer season when the trees are subjected to strong sunshine, it is desirable to dust only the underneath sides of the leaves and the interior of the tree and to avoid as much as possible the application of dust to the exterior of the tree so as to avoid sulphur burns. However, during the winter season it is desirable to dust the exterior surfaces of the leaves as well, particularly for the control of certain spiders and similar pests.

It is another object of my invention to provide a nozzle and conduit structure which may be employed to simultaneously dust both the interior and exterior portions of a tree.

Another object of my invention is to provide a dusting apparatus in which the nozzles are automatically oscillated about a horizontal axis so as to direct blasts of the air and dust in different directions against the surface of the leaves to insure the complete contacting and covering of the leaves with dust.

It is also an object of my invention to provide an apparatus of the character set forth in the preceding paragraph which employs a novel joint or elbow construction between the dusting nozzles and the carriage to permit adjustment of the angular position and the location of the nozzle.

It is a further object of my invention to provide a nozzle construction for use in an apparatus of the character set forth in the preceding paragraphs which includes a means for adjusting the scope of the dust blast and the relative amounts directed against the under and upper tree surfaces.

Other objects and advantages of my invention will be apparent from a study of the following specifications, read in connection with the accompanying drawing, wherein:

Fig. 1 is an elevational view illustrating the appearance of the preferred embodiment of my invention and the manner in which it is employed to simultaneously dust two rows of trees;

Fig. 2 is a plan view of the equipment illustrated in Fig. 1;

Fig. 3 is a longitudinal section through a novel elbow construction employed with the apparatus illustrated in Figs. 1 and 2;

Fig. 4 is a fragmentary perspective view illustrating the appearance and details of construction of the nozzles employed to distribute the dust through the trees; and Fig. 5 is a fragmentary vertical section taken substantially along the line V—V of Fig. 4 to illustrate the details of construction of a novel adjusting mechanism.

Referring to the drawing, I have illustrated in Figs. 1 and 2 the preferred embodiment of my invention as including a carriage 1 which may be constructed as a modified form of truck or cart employing wheels 2 by means of which the carriage may be moved over the ground surface 3 between adjacent rows of trees 4 and 5. The carriage 1 is adapted to support a suitable source of power (not shown) which may comprise an internal combustion engine or other self-contained prime mover.

The power source or engine is drivably coupled with a pair of fans or blowers 6 and 7 which have intakes 8 and 9, respectively, coupled to a dust bin 10 which contains a supply of finely divided sulphur or other insecticide or fungicide which is to be applied to the trees. A downwardly extending pipe 11 is connected to the discharge of the blower 6 and connected to a horizontally extending conduit 12, the outer end of which is provided with upwardly directed nozzles 13 adapted to distribute throughout the foliage of the tree 4 the dust which is delivered thereto by means of the conduits 11 and 12 by the fan or blower 6.

As illustrated in Figs. 1 and 2, the conduit 12 is arranged to be carried in a horizontal position immediately above and closely adjacent the surface of the ground 3 so that the nozzle 13 may be readily swung into position beneath the tree without interfering with branches thereof. I prefer to support the conduit 12 upon the carriage 1 in such manner that the conduit may be pivotally moved to a position disposing the nozzle 13 beneath a tree so as to maintain the nozzle thereunder as the carriage is advanced along in the rows between the trees.

To permit the conduit 12 to be swung forwardly and rearwardly of the carriage, I connect the inner end thereof to the downwardly extending pipe 11 by means of an elbow 14 and provide a rotary joint 15 between the downwardly extending end of the pipe 11 and the upwardly directed end of the elbow.

One form of rotary joint which will serve this purpose is illustrated in detail in Fig. 3 as being formed by radially flanging the end of the pipe 11 as indicated at 16, while a similar radial flanging of the end of the elbow 14 is employed as indicated at 17. The abutting faces of the flanges 16 and 17 are spaced apart by means of a packing ring 18 which, as is illustrated, is provided with an internal radially disposed V-shaped groove 19 so that air pressure within the pipe 11 and elbow 14 will be so directed upon the packing 18 as to cause the inner edges of the packing to be expanded out into snug relation with the flanges 16 and 17.

To hold the end of the pipe 11 and the elbow 14 together, I employ a unit which may comprise a nut member 20 having a central bore 21 sufficient to readily pass over the circumference of the body portion of the pipe 11 prior to the flanging out of the flange 16. A cooperating nut 22 is similarly provided upon the elbow 14 prior to the flanging out of the flange 17, the nuts 20 and 22 being provided with male and female threads, as indicated at 23, so that they may be threadedly assembled together to retain the packing 18 in place and prevent relative movement of the pipe 11 and elbow 14 away from each other, while permitting the relative rotational movement between these members.

It will be seen that this construction permits the outer end of the conduit 12 to be swung about the vertical axis defined by the downwardly extending pipe 11 so that the nozzle 13 may be disposed beneath a tree in advance of the position of the carriage and then rotated beneath the tree as the carriage advances. The nozzle 13 is accordingly preferably constructed to produce a substantially fan-shaped blast of air and dust, the plane of the fan extending parallel to the longitudinal axis of the conduit 12. As the conduit 12 is rotated in the manner pointed out above, the fan-shaped blast of air and dust will also be rotated through a considerable portion of a revolution as the carriage advances and will so extend the area of the dust blast as to cause a substantially even distribution of the dust throughout the entire tree.

In view of the fact that the total angle through which the conduit 12 may be moved is relatively limited, the efficiency of the applicator and the even and complete distribution of the dust throughout the trees may be greatly increased by so arranging the nozzle 13, as shown in Figs. 4 and 5, that while the plane of the fan shape of the nozzle is generally disposed parallel to the axis of the conduit 12, the nozzle is, in fact, adapted to direct four separate fan shaped blasts upwardly into the tree, each of these blasts being disposed at an angle to the others so as to extend the scope of the combined blast and provide more complete and even distribution of the dust throughout the foliage and fruit.

The nozzle 13 is accordingly preferably constructed along the lines illustrated in Fig. 4 from sheet metal and includes a pair of nozzle elements 13a and 13b which are each provided with side walls 24 and 25 which slope upwardly and inwardly toward each other to provide a relatively long and narrow fan-shaped outlet 26 and a relatively short and wide inlet 27 connecting to the conduit 12. The planes of the nozzles 13a and 13b are both disposed parallel to the axis of the conduit 12 while the axes of these nozzles are disposed at an angle to each other so that the blast from the nozzle 13a is directed upwardly at one angle and the blast from the nozzle 13b is directed upwardly at a different angle. Between the nozzles 13a and 13b, I dispose a third fan-shaped nozzle 13c which may include, as is best illustrated in Fig. 5, a pair of upwardly extending side walls 28 and 29 which define a relatively long and wide inlet 30 and slope inwardly toward each other to define a relatively long and narrow discharge 31.

A pair of adjustment leaves 32 and 33, one secured as by welding or other suitable means to the side wall 29 and the other secured to the side wall 28, are provided extending diagonally across the passage formed by the side walls 28 and 29 so as to partially close this passage. The amount which these leaves restrict the flow of dust and air may be adjusted by means of adjusting screws 34 and 35 threadedly engaged with the side walls 29 and 28, respectively, and disposed in a position to bear against the leaves 32 and 33 so that rotation of these screws will operate to force the leaves outwardly away from the side wall to which they are attached, the resilience of the material employed being relied upon to restore the leaves to their original position whenever the adjusting screws are loosened.

It frequently occurs that in treating a grove or orchard certain of the trees will not be symmetrical in shape so that the mere disposition of the nozzle 13 beneath the trees and the rotation thereof in a horizontal plane by the forward movement of the carriage 1 will not sufficiently distribute the dust throughout all portions of such non-symmetrical trees. I have accordingly provided for rotation of the conduit 12 about its own longitudinal axis so that the fan-shaped blasts of air and dust which are discharged from the nozzle 13 may be directed differently under different trees as indicated by the judgment of an operator of the machine as to how the blast should be most effectively directed against that particular tree. For this purpose I provide a rotary joint 36 between the lower end of the elbow 14 and the conduit 12 which comprises a short cylindrical outer shell member 37 into which the outer end of the elbow 14 may project and which may be fixed to the elbow 14 by bolts or rivets 38. The free end of the conduit 12 may project into the shell 37 and into telescopic relation with the free end of the elbow 14 as indicated in Fig. 3. To permit relatively free rotation of the conduit 12, the shell 37 may have a pair of grooves 37a formed upon its inner surface near opposite ends of the shell, to be aligned with corresponding grooves 12a formed on the exterior surface of the conduit 12 so that the cooperating grooves 37a and 12a constitute a ball race into which a plurality of metal balls 39 may be placed and which will act to hold the conduit 12 fixed against longitudinal movement relative to the shell 37 but which will permit free rotation between these members.

The length of the conduit 12 will of course vary with the spacing of the rows of trees which are found in the various orchards and the overhanging weight of the nozzles and conduit may be supported by means of suitable springs 40, one end of which may be secured to suitable brackets 41 formed on the carriage while the other end of which may be secured to a yoke or clevis 42 which is in turn secured to the shell 37 of the rotary joint 36.

When the apparatus is to be used for the dusting of trees, an operator may ride upon a seat or platform 43 on the carriage 1 and from which he may control both the horizontal positioning of the nozzle beneath the trees and the maintaining of the nozzle beneath the tree as the carriage advances by means of a suitable pull rope 44 secured in any suitable manner to the conduit 12, the disposition of the springs 40 and the bracket 41 being such as to constantly urge the conduit 12 to a position in advance of the carriage. Hence by releasing the rope 44 the conduit will swing forwardly into position beneath the next adjacent tree and then by gradually drawing in upon the pull rope 44 as the carriage advances the nozzle 13 may be maintained beneath this tree and will rotate through a considerable angle beneath the tree.

Also the operator may have a pair of reins 45 and 46 extending from a bridle 47 secured to the conduit 12 to the seat 43 so that by pulling upon one or the other of the reins 45 and 46 the nozzle 13 and the conduit 12 may be rotated about a horizontal axis to oscillate beneath the tree and more effectively direct the blasts of dust upon the tree.

I have illustrated the blowers, conduits and nozzles as being duplicated on either side of the machine so as to permit the simultaneous treatment of two rows of trees and duplicate controls may be provided so that each of the conduits may be independently controlled.

Since each of the nozzles 13 is independently controlled, I provide valves 48 and 49 disposed between the inlet 8 and the dust bin 10 and between the inlet 9 and the dust bin 10 so that throughout the operation of the device the operator controlling one of the nozzles 13 may, at all times, control the quantity of dust which is to be injected into the blast of air independently of similar control exercised by the other operator.

In order to permit the dusting of the exterior leaves as well as the interior of the tree, I may provide an auxiliary nozzle 13x on the conduit 12 as by forming the nozzle 13x in a short section of conduit which may be interposed in the conduit 12 between the rotary joint 36 and the nozzle 13. The nozzle 13x is shaped as illustrated in Figs. 1, 2 and 4 such that a substantially fan-shaped blast of dust is directed upwardly and away from the carriage 1 so as to project about the exterior surfaces of the tree.

When the apparatus illustrated herein is to be used for the purpose of dusting vegetables and low vines, the nozzle 13 may be inverted so as to direct the blasts of dust downwardly instead of upwardly and it is found extremely effective to fix the conduits 12 and 13 in a position extending at right angles to the path of the carriage 1 as by providing a locking brace rod 50 between the clevis 42 and a suitable socket 51 formed upon or attached to some stationary part of the carriage 1. When so locked against swinging movement, the nozzles 13 may be manually or automatically oscillated as the carriage advances. To permit of automatic oscillation, I provide an eccentric pin 52 on one of the carriage wheels 2 to which may be removably secured a connecting rod 53, the outer end of which may be detachably connected as by means of a yoke or clevis 54 to the bridle 47 on the conduit. Now as the carriage is moved forwardly, the connecting rod will be reciprocated forwardly and rearwardly, causing an automatic oscillation of the conduit 12.

While I have shown and described the preferred embodiment of my invention, I do not desire to be limited to any of the details of construction shown or described herein, except as defined in the appended claims.

I claim:

1. In a dust applicator including a means for producing a blast of air mixed with dust and a horizontally disposed conduit for conducting said blast to a point beneath a tree, a means for directing said blast comprising: a nozzle on said conduit near said outer end having such shape as to discharge a pair of upwardly directed and substantially fan shaped blasts of dust and air, said nozzle being so formed and positioned as to dispose the plane of said fan shapes at an angle to each other and substantially parallel to the axis of said conduit.

2. In a dust applicator including a means for producing a blast of air mixed with dust and a horizontally disposed conduit for conducting said blast to a point beneath a tree, a means for directing said blast comprising: a nozzle on said conduit near said outer end for discharging a plurality of upwardly directed and substantially fan shaped blasts of dust and air, said nozzle including a pair of nozzle elements spaced from each other and each having an elongated discharge opening extending substantially parallel to the axis of said pipe, and a third nozzle element disposed between said pair of elements and having an elongated discharge opening extending transversely of the axis of said conduit.

3. In a dust applicator including a means for producing a blast of air mixed with dust and a horizontally disposed conduit for conducting said blast to a point beneath a tree, a means for directing said blast comprising: a nozzle on said conduit near said outer end for discharging a plurality of upwardly directed and substantially fan shaped blasts of dust and air, said nozzle including a pair of nozzle elements spaced from each other and each having an elongated discharge opening extending substantially parallel to the axis of said pipe, a third nozzle element disposed between said pair of elements and having an elongated discharge opening extending transversely of the axis of said conduit, and a pair of oppositely directed deflector means within said third element for deflecting one part of the fan-shaped blast discharged through said opening into a plane inclined in one direction from the plane of said fan shape and for deflecting another part of said blast into a plane inclined in the opposite direction from the plane of said fan shape.

4. In a dust applicator including a means for producing a blast of air mixed with dust and a horizontally disposed conduit for conducting said blast to a point beneath a tree, a means for directing said blast comprising: a nozzle on said conduit near said outer end having such shape as to discharge an upwardly directed and substantially fan shaped blast of dust and air, said nozzle being so positioned as to dispose the plane of said fan shape substantially parallel to the axis of said conduit; and an auxiliary nozzle on said conduit spaced inwardly from said outer end having such shape as to discharge an upwardly and outwardly directed and substantially fan shaped blast of dust and air, the plane of which is disposed substantially parallel to the axis of said conduit.

5. In a dust applicator including a means for producing a blast of air mixed with dust and a horizontally disposed conduit for conducting said blast to a point beneath a tree, a means for directing said blast comprising: a nozzle on said conduit near said outer end for discharging a plurality of upwardly directed and substantially fan shaped blasts of dust and air, said nozzle having such shape as to dispose the plane of each of said fan shapes at an angle to the others; and an auxiliary nozzle on said conduit spaced inwardly from said outer end having such shape as to discharge an upwardly and outwardly directed and substantially fan shaped blast of dust and air, the plane of which is disposed substantially parallel to the axis of said conduit.

DONALD PARKER.